3,527,916
PROTECTIVE GAS WELDING PROCESS
Karl-August Ebert, Neu-Isenburg, and Heinrich Schrader, Hochdahl, Germany, assignors to Messer Griesheim GmbH, Frankfurt am Main, Germany, a corporation of Germany
No Drawing. Filed Feb. 14, 1969, Ser. No. 799,535
Claims priority, application Germany, Feb. 14, 1968, 1,652,826
Int. Cl. B23k 9/16, 35/38
U.S. Cl. 219—74                                     2 Claims

ABSTRACT OF THE DISCLOSURE

A protective gas welding process utilizing a current conducting and consumable wire electrode includes argon and oxygen as the protective gas mixture with the electrode containing additives of deoxidizing constituents. The gas mixture contains 5 and 25% oxygen with respect to unalloyed and low alloyed steel as well as between 3 and 25% oxygen with respect to high alloyed steel, and with increasing oxygen, wire electrodes are used with an increasing content of deoxidizing constituents.

BACKGROUND OF INVENTION

This invention relates to a protective gas welding process with current conducting and consuming wire electrode for unalloyed and alloyed steel.

As the protective gas for these welding processes the following mixtures and gases were previously used: carbon dioxide, argon, mixtures of argon and carbon dioxide, argon plus oxygen as well as argon plus carbon dioxide plus oxygen. These protective gases have certain disadvantages. With pure argon there results a porous welding seam of bad shape. With pure $CO_2$ a better shape of the welding seam is obtained, but a spraying arc must be tolerated. The removal of the welding sprayer near the seam is time-consuming and expensive.

Better results are obtained with mixtures of argon as the basic gas and additions of carbon dioxide and oxygen. While the object of the carbon dioxide in the mixture is to improve the form of the welding seam, oxygen serves for decreasing the surface stress of the welding melts. Wetting is thereby improved, degasification speed is increased and therefore the formation of pores is decreased. Under laboratory requirements, entirely satisfactory weldings are obtained with several of these mixtures, e.g. argon and a maximum of 5% oxygen. However, in practice it is difficult to maintain exactly the laboratory requirements with their narrow tolerances, hence above all pore security of such protective gas weldings is sometimes left to be desired.

In all known mixtures the oxygen content is limited to a maximum of 5%. It is feared that with a higher oxygen content the consumption of alloying elements and especially of carbon would be too high. For high-alloyed steel, the oxygen content is therefore limited to 3%. These fears were apparently confirmed by investigations concerning the consumption behavior as a function of oxygen addition to the welding argon, such as in "Linde Berichte aus Technik and Wissenschaft," No. 6, 1959, pp. 45 to 46, where as a practical limit for the oxygen content 5% is named also.

SUMMARY OF INVENTION

We have determined that the oxygen content in the protective gas mixture argon-oxygen can be considerably increased to a maximum of 25%. The quality of the welding is unexpectedly noticeably better here and the protective gas mixture is of course cheaper.

The object of the invention is to provide a protective gas process of the named type, where to each oxygen proportion there is arranged a wire electrode of optimum composition.

A protective gas welding process with current conducting and consuming wire electrode has now been found where the protective gas is a mixture of argon and oxygen and the wire electrode contains additives of deoxidating constituents. According to the invention, the process is characterized in that the protective gas mixture contains between 5 and 25% oxygen with respect to unalloyed and low-alloyed steel as well as between 3 and 25% oxygen with respect to high-alloyed steel, and with increasing oxygen, wire electrodes are used with an increasing content of deoxidizing constituents.

DETAILED DESCRIPTION

In accordance with the invention as the deoxidating constituents, there are primarily considered silicon and manganese, but also constituents which can entirely or partially replace silicon and manganese, such as titanium, aluminum, chromium and rare earths. The requirement that with high oxygen contents wire electrodes with a high content of deoxidizing constituents must be used, and the reverse, must be fulfilled, independent of whether alloyed or non-alloyed steel is to be welded and independent of which deoxidizing constituents are being considered. If for instance one operates with high oxygen content in the mixture and low silicon-manganese proportions in the wire electrode, yield point and notch impact strength go down inadmissibly.

The relationship between the oxygen content in the mixture and the content of deoxidizing constituents in the electrode is apparent from the following test examples which were obtained with respect to various welding material tests according to DIN 1913 p. 2. Test examples I, II and III clearly show how the ultimate stress factors drop with increasing oxygen content and constant electrode composition.

From the test results it is not difficult to read the connection between oxygen content and content of deoxidizing constituents. It is further characteristic and advantageous for the process that tolerances are not too narrow. Thus for the range of 9 to 13% and 17 to 19% oxygen with the same electrode, nearly equally good or equally good test results are obtained. The mixture ratio need also not be maintained altogether exact. This is particularly advantageous when the protective gas mixture is obtained from the liquid phase by vaporization, since no attention need be paid to separation processes.

The protective gas mixture of argon-oxygen is made considerably cheaper by the high oxygen portion in the mixture. The electrodes needed for the particular oxygen content are easily obtained.

Of course the novel process can be used even when small amounts of nitrogen in the protective gas mixture are still contained as impurities. Also several percent carbon dioxide can be admixed.

TABLE

| | | | | |
|---|---|---|---|---|
| (I) | O₂ content | 9% | Notch impact strength with DVM test. | 19.3–20.8 Kpm./cm.² at +20°C. |
| | Electrode | 0.4% Si | Notch impact strength in the joint weld at boiler plate H II. | 17.7–19.8% Kpm./cm.² at +20°C. 18.4–21.2 Kpm./cm.² at ±0°C. |
| | | 1.0% Mn | Yield point | 59.9 Kp./mm.². |
| | | | Tenacity | 62.7 Kp./mm.². |
| | | | Elongation at break, σ₅ | 24%. |
| | | | Shrinkage at break | 70%. |
| | | | Folding test | 180° with simple mandrel diameter. |
| (II) | O₂ content | 13% | Notch impact strength | 18.1–19.3 Kpm./cm² at +20°C. 15.6–17.9 Kpm./cm.² at ±0°C. |
| | Electrode | 0.4% Si | Yield point | 56.9 Kp./mm.². |
| | | 1.0% Mn | Tenacity | 60.2 Kp./mm.². |
| | | | Elongation at break, σ₅ | 26%. |
| | Boiler plate: H II DVM-test | | Shrinkage at break | 68%. |
| | | | Folding test | |
| (III) | O₂ content | 15% | Yield point | 48.0–47.6 Kp./mm.². |
| | Electrode | 0.4% Si | Tenacity | 49.7–50.1 Kp./mm.². |
| | | 1.0% Mn | Elongation at break, σ₅ | 29.4–31.0%. |
| | Boiler plate H II | | Shrinkage at break | 75–73%. |
| (IV) | O₂ content | 17% | Notch impact strength | 15.4–17.1 Kpm./cm.² at +20°C. |
| | Electrode | 1.1% Si | Yield point | 50.2–52.4 Kp./mm.². |
| | | 1.6% Mn | Tenacity | 56.7–57.0 Kp./mm.². |
| | | | Elongation at break, σ₅ | 28.5–30.8%. |
| | Boiler plate 20 mm. vertically welded | | Shrinkage at break | 68–69%. |
| | | | Folding test | 4 times 180° with simple mandrel diameter. |
| (V) | O₂ content | 19% | Notch impact strength | 15.4–17.1 Kpm./cm.² at 20°C. |
| | Electrode | 1.1% Si | Yield point | 50.2–52.4 Kp./mm.². |
| | | 1.6% Mn | Tenacity | 56.7–57.0 Kp./mm.². |
| | | | Elongation at break, σ₅ | 28.5–30.8%. |
| | | | Shrinkage at break | 68–69%. |
| | | | Folding test | 4 times 180° with simple mandrel diameter. |

What is claimed is:

1. In a process for protective gas welding of unalloyed steel by direct current with a current conducting and consumable wire electrode, the protective gas being a mixture of argon with from 5 to 25% oxygen, the wire electrode containing a deoxidizing constituent selected from the group consisting of manganese and silicon, characterized in that the wire electrode further includes an additive deoxidizing constituent selected from the group consisting of titanium, chromium, aluminum and rare earths, and further characterized in that with an increasing oxygen portion in the protective gas, wire electrodes are used with an increasing content of deoxidizing constituents.

2. In the process of claim 1 wherein the additive deoxidizing constituent is titanium.

References Cited

UNITED STATES PATENTS

| 2,908,800 | 10/1959 | Breymeier | 219—74 |
| 3,143,631 | 8/1964 | Sohn et al. | 219—74 |
| 3,253,113 | 5/1966 | Breymeier | 219—74 |

WILLIAM D. BROOKS, Primary Examiner